United States Patent [19]

Ford

[11] Patent Number: 4,668,706

[45] Date of Patent: May 26, 1987

[54] SUBSTITUTED ALIPHATIC POLYAMIDE POROUS MEMBRANES

[75] Inventor: Douglas L. Ford, Eastwood, Australia

[73] Assignee: MEMTEC Limited, New South Wales, Australia

[21] Appl. No.: 886,679

[22] Filed: Jul. 18, 1986

Related U.S. Application Data

[62] Division of Ser. No. 758,228, filed as PCT AU/84/00210 on Oct. 18, 1984, published as WO85/01735 on Apr. 25, 1985 now Pat. No. 4,613,625.

[30] Foreign Application Priority Data

Oct. 18, 1983 [AU] Australia ............................... PG1902

[51] Int. Cl.⁴ .............................................. C08J 9/36
[52] U.S. Cl. .................................... 521/53; 210/500.2; 210/500.38; 210/654; 210/500.38; 521/64; 521/184; 521/189
[58] Field of Search ................... 521/53, 64, 184, 189; 210/500.2, 654, 500.38

[56] References Cited

U.S. PATENT DOCUMENTS 3,904,519  9/1975  McKinney, Jr. et al. .......... 210/654
4,613,625  9/1986  Ford ...................................... 521/53

FOREIGN PATENT DOCUMENTS 47569    4/1974   Australia .
502153   9/1977   Australia .
505494   11/1979  Australia .
55789    8/1980   Australia .
0014054  10/1980  European Pat. Off. .

*Primary Examiner*—Morton Foelak
*Attorney, Agent, or Firm*—Oblon, Fisher, Spivak, McClelland & Maier

[57] ABSTRACT

Aliphatic thermoplastic polyamide porous membranes are reacted with an acid halide of basicity above one to provide acid radicals within the membrane. The acid halide may be derived from an aromatic carboxylic acid or an aromatic derivative of a chlorosilane. The substituted aliphatic polyamide porous membrane lend themselves to the preparation of chemical derivatives of the membrane which are not readily available by aqueous synthesis and to increased density of derivatives which otherwise may be prepared by water.

10 Claims, No Drawings

SUBSTITUTED ALIPHATIC POLYAMIDE POROUS MEMBRANES

This is a division, of application Ser. No. 758,228, filed June 13, 1985.

FIELD OF INVENTION

This invention relates to porous membranes made from aliphatic thermoplastic polyamide materials.

BACKGROUND ART

Synthetic polymeric membranes are used for separation of species by dialysis, electrodialysis, ultrafiltration, cross flow filtration, reverse osmosis and other similar techniques. One such synthetic polymeric membrane is disclosed in Australian Patent Specification No. 505,494 of Unisearch Limited.

The memberane forming technique disclosed in the Unisearch Patent is broadly described as being the controlled uni-directional coagulation of the polymeric material from a solution which is coated onto a suitable inert surface. The first step in the process is the preparation of a "dope" by dissolution of a polymer. This is said to be achieved by cutting the hydrogen bonds (which link the molecular chains of the polymer together) with a solvent. After a period of maturation, the dope is then cast onto a glass plate and coagulated by immersion in a coagulation bath which is capable of diluting the solvent and annealing the depolymerized polymer which has been used. According to the one example given in this specification, the "dope" consisted of a polyamide dissolved in a solvent which comprised hydrochloric acid and ethanol.

In another membrane forming technique, the liquid material out of which the membrane is cast is a colloidal suspension which gives a surface pore density that is significantly increased over the surface pore density of prior membranes.

According to that technique, a thermoplastic material having both relatively non-crystalline and relatively crystalline portions is dissolved in a suitable solvent under conditions of temperature and time which cause the relatively non-crystalline portions of the thermoplastic material to dissolve whilst at least a portion of the relatively crystalline portion does not dissolve but forms a colloidal dispersion in the solvent. The colloidal dispersion and solvent (i.e. the "dope") is then coated onto a surface as a film and thereafter precipitation of the dissolved thermoplatic portion is effected to form a porous membrane.

Such aliphatic polyamide membranes suffer from disadvantages which limit their commercial usefulness and applicability. For example they exhibit dimensional instability when drying and may shrink by up to 7%. Thus, it is essential that they be kept moist prior to and after use. Furthermore, it has not been possible to generate chemical derivatives of the membrane matrix which restricts the situations to which the membrane may be applied.

Another disadvantage is that such polyamide membranes are fundamentally unstable and eventually become brittle on storage. The instability has been carefully investigated by I. R. Susantor of the Faculty of Science, Universitas Andalas, Padang, Indonesia with his colleague Bjulia. Their investigations were reported at the "Second A.S.E.A.N. Food Waste Project Conference", Bangkok, Thailand (1982) and included the following comments regarding brittleness:

"To anneal a membrane, the thus prepared membrane (according to Australian Pat. No. 505,494 using Nylon 6 yarn) is immersed in water at a given temperature, known as the annealing temperature, T in degrees Kelvin. It is allowed to stay in the water a certain length of time, called the annealing time. For a given annealing temperature, there is a maximum annealing time, t(b) in minutes, beyond which further annealing makes the membrane brittle. Plotting ln 1/t(b) versus 1/T gives a straight line. From the slope of this line it can be concluded that becoming brittle on prolonged annealing is a process requiring an activation energy of approximately 10.4 kilocalories/mole. From the magnitude of this activation energy, which is of the order of van der Waals forces, the various polymer fragments are probably held together by rather strong van der Waals forces or hydrogen bond(s)."

We have confirmed that the brittleness is due to a recrystallization of water-solvated amorphous polyamide. In some cases (such as polyamide 6) brittleness occurs within 48 hours of immersion in distilled water (pH7) at 80° C. Colorimetric $—NH_2$ end group analysis has shown that there is no significant hydrolysis of the amide groups during this time. As would be expected, the rate of embrittlement is catalysed by dilute acids (eg: pH of 1.0) due to nitrogen protonation and subsequent solvation. This effect explains the apparently low acid resistance of the polyamide membranes. However colorimetric determination of both $—NH_2$ end groups and $—COOH$ end groups has shown that the effect is due to crystallization rather than acid catalysed hydrolysis.

That most of the brittleness is due to physical effects rather than chemical decomposition or chemical solvation (at least for dilute acids) is shown by the extreme embrittlement caused on standing 5 minutes in absolute ethanol.

The problem of crystallization of the aliphatic polyamide material can be overcome by cross-linking portions of the polyamide through the reaction of a bis-aldehyde with the membrane matrix as is described in our International Patent Application No. PCT/AU84/00015 "Cross-Linked Porous Membranes". However, the chemical derivatives of such cross-linked polyamide membranes are limited to those which can be prepared in water and thus those membranes can not be used to provide derivatives which do not lend themselves to aqueous synthesis such as the ester of 4-hydroxybenzaldehyde. Furthermore, the density of derivatives prepared in water may not be as large as desired. For example, the up-take of resorcinol in the glutaraldehyde cross-linked membrane of example 2 of our above mentioned International Patent Application was only 0.2% of the dry weight of the membrane.

It is an object of this invention to provide aliphatic polyamide porous membranes which lend themselves to the preparation of chemical derivatives which are not readily available by aqueous synthesis and to increased density of derivatives which otherwise may be prepared in water.

DISCLOSURE OF THE INVENTION

According to the invention there is provided a polymeric porous membrane comprising a membrane matrix made from an aliphatic thermoplastic polyamide material which has both relatively non-crystalline and relatively crystalline portions joined together by relatively non-crystalline portions characterised in that at least some of the relatively non-crystalline portions of the membrane are reacted with an acid halide of basicity above one to provide within the membrane the following type of structures:

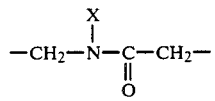

where X is the acid radical of the acid halide of basicity above one.

Preferably, the acid halide is derived from an aromatic carboxylic acid or an aromatic derivative of a chlorosilane. Particularly preferred acid halides are terephthaloylchloride, isophthaloylchloride, and the reaction product of an excess of a dichlorosilane with a diphenol.

The utility of the acid halide treated polyamide membranes of the invention may be further improved by reacting the free end of the terminal acid halide chain with a phenol of basicity above one (such as resorcinol) so that the free end of the acid halide becomes a phenol ester as follows:

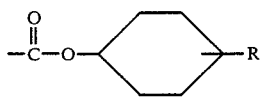

where R is a substituent consisting of or containing at least one phenolic group.

Apart from resorcinol, the phenolic component may be a phenol derivative such as 2,2-bis(4-hydroxyphenyl)propane.

The resultant phenolic ester may be cross-linked by reaction with an aldehyde such as with glutaraldehyde. A small amount of formaldehyde may be additionally used as the final aldehyde link particularly if free ends are further reacted with resorcinol. The original polyamide membrane thus becomes a block co-polymer of polyamide/aromatic polyester/phenol-aldehyde, all with little effect on the original porosity.

The terminal aromatic acid chloride intermediate membranes are particularly useful to form derivatives so that the membranes can react with biological products such as —NH$_2$ or —COOH terminated proteins. The resulting products may be used to isolate pure products by affinity chromatography.

The invention also provides a method of preparing a porous memberane which comprises the steps of:
(i) dissolving an aliphatic thermoplastic polyamide which has both relatively non-crystalline and relatively crystalline portions into a solvent under conditions of temperature and time which cause the relatively non-crystalline portions of the polyamide to dissolve while at least a part of the relatively crystalline portions of the polyamide do not dissolve, but, form a colloidal dispersion in said solvent,
(ii) forming said colloidal dispersion and solvent into a film and thereafter causing precipitation of at least part of the dissolved non-crystalline portions in the film to form a porous membrane matrix, and,
(iii) reacting the membranes matrix with an acid halide of basicity above one to provide within the membrane the following types of structures:

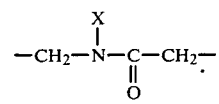

where X is the acid radical of the acid halide of basicity above one.

DESCRIPTION OF PREFERRED EMBODIMENTS

EXAMPLE 1

A solvent (A) was prepared by mixing 225 ml of 6.67N hydrochloric acid with 15 ml of anhydrous ethanol. 90 grams of 50 datex 17 filament polyamide 6 with 109S twists per metre (which constitutes the thermoplastic starting material) was added to solvent (A) held at a temperature of 22° C. over a period of less than 15 minutes.

The dope of the polyamide 6 and solvent (A) was then left to mature for 24 hours at a temperature of 22° C. during which the relatively non-crystalline portions of the polyamide 6 dissolved as did no more than 50% of the relatively crystalline portions of the polyamide 6 with the remaining relatively crystalline portion dispersing in the solvent.

After maturation, the dope was then spread as a film of about 120 micron thick on a clean glass plate. The coated plate was placed in a water bath where precipitation of the dissolved portions of the polyamide was effected within 3 minutes. The membrane had a water permeation rate of 330L/M$^2$.h at 100 kPa pressure. It shrank 7% on drying and crystallized to a brittle sheet on heating at pH7 for 48 hours at 80° C. It dissolved readily and completely in 7N hydrochloric acid.

A sheet (B) of the above membrane was dried at 60° C. to constant weight. A portion of the sheet (B) weighing 144 g was soaked in 1 L of petroleum spirit containing 20 g of isophthaloylchloride as the acid halide and 50 g of powdered potassium carbonte for 20 hours at 22° C. Three independent analyses (chloride ion formed, weight increase of the sheet and loss from the petroleum spirit) showed that 18 g to 19 g of isophtthaloylchloride had reacted. This sheet (C) was washed with petroleum spirit and dried at 60° C. in dry air.

A 35 g portion of membrane (C) was reacted with 0.1M sodium carbonate for 15 minutes at 60° C. giving copious carbon dioxide and chloride ion. The membrane was then washed with water and gave a water permeation rate at 100 kPa pressure for 313L/M$^2$h. After soaking in 2N hydrochloric acid and washing the rate was 303 L/M$^2$h and the membrane stained blue with methylene blue showing abundant free carboxylic acid groups.

The rest of the sheet—membrane (C)—was reacted with 2L of aqueous solution containing 20 g resorcinol at pH 9.0 with sodium carbonate to become membrane (D). Analysis showed the up-take of 5.6 g of resorcinol. The membrane (D) was washed and showed a water permeation rate of 150L/M$^2$h at 100 kPa pressure. Membrane (D) was much more resistant than the original membrane to 5N hydrochloric acid. A portion of membrane (D) was stained deep orange by a solution of p-nitro-benzenediazonium tetrafluoroborate showing the presence of large amounts of resorcinol derivative.

An 88 g portion of membrane (D) was heated for 4 days at 60° C. with a 2.2% w/v solution of glutaraldehyde at pH 4.0 and then washed to give a membrane (E). Membrane (E) showed a 2.5% change in length when dried, then wetted. The permeation rate was now 272L/M²h. The resistance to acid was improved. The presence of free —CHO groups was proven by the intense violet formed with fuchsin-NaHSO₃ reagent. The latter test is due to the combination of the —CHO groups in membrane (E) with NaHSO₃ to form a hydroxysulphonic acid derivative. A further indication of copious —CHO groups was the up-take of 2,4—dinitrophenylhydrazine from 3N hydrochloric acid to form the deep yellow 2,4-dinitrophenyl-hydrazone.

Each 100 g of dry original membrane had sequentially taken up 12.6 g isophthaloychloride, 4.4 g resorcinol and 4.0 g glutaraldehyde.

EXAMPLE 2

The procedures of EXAMPLE 1 were repeated using terephthaloylchloride as the acid halide instead of isophthaloylchloride and gave very similar results except that at that stage (C) in EXAMPLE 1 the membrane was relatively stiff.

EXAMPLE 3

A solution of 2.97 g of 2,2-bis(4-hydroxyphenyl)propane in 10 ml of dry pyridine was poured onto 3.22 g of stirred dimethyldichlorosilane precipitating pyridine hydrochloride as waste.

The acid chloride so formed was, in effect, a silicon analogue of an aromatic bis(acid chloride) as chemical considerations suggest that it had the following structure:

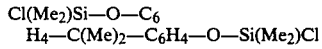

A portion of the dry starting membrane (B) as in EXAMPLE 1 was added and heated 1 hour at 60° C. The resultant sheet was washed in pyridine, then ethanol, then methylenechloride and dried. The permeation rate of N/10 caustic soda at 100 kPa pressure both before and after treatment was 169L/M²h. One unexpected difference was that the treatment doubled tannic acid adsorption. The explanation is that the treatment conferred silicic acid derivative end-groups.

I claim:

1. A polymeric porous membrane comprising a membrane matrix made from an aliphatic polyamide material which has both relatively non-crystalline and relatively crystalline portions joined together by relatively non-crystalline portions wherein at least some of the relatively non-crystalline portions of the membrane have the following type of structure:

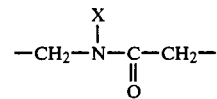

where X is the acid radical of an acid halide of basicity above one or a derivative of said acid halide.

2. A membrane according to claim 1 wherein the free end of the terminal acid halide chain has been reacted with a phenol of basicity above one so that the free end of the acid halide becomes a phenol ester as follows:

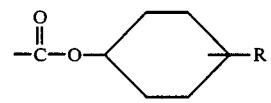

where R is a substituent consisting of or containing at least one phenolic group.

3. A membrane according to claim 2 wherein the phenol is resorcinol.

4. A membrane according to claim 2 wherein the membrane is cross-linked by reaction with an aldehyde.

5. A membrane according to claim 4, wherein the aldehyde is glutaraldehyde.

6. A membrane according to claim 5, modified in that formaldehyde is used as an additional linking reagent.

7. A membrane as claimed in claim 2 where the acid halide is an organic or metal-organic halide.

8. A membrane according to claim 7 wherein the acid halide is derived from an aromatic carboxylic acid or an aromtic derivative of a chlorosilane.

9. A membrane according to claim 7 wherein the acid halide is either terephthaloylchloride, or isophthaloylchloride.

10. A membrane according to claim 7 wherein the acid halide is the reaction product of an excess of a dichlorosilane with a diphenol.

* * * * *